United States Patent
McDonough et al.

(10) Patent No.: US 8,676,687 B2
(45) Date of Patent: *Mar. 18, 2014

(54) ASSET PLANNING AND TRACKING

(71) Applicants: John McDonough, Nahant, MA (US); Steve Elterich, Canton, MA (US)

(72) Inventors: John McDonough, Nahant, MA (US); Steve Elterich, Canton, MA (US)

(73) Assignee: FMR LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/961,580

(22) Filed: Aug. 7, 2013

(65) Prior Publication Data

US 2013/0325751 A1 Dec. 5, 2013

Related U.S. Application Data

(63) Continuation of application No. 10/740,159, filed on Dec. 17, 2003, now Pat. No. 8,527,382.

(51) Int. Cl.
*G06Q 40/00* (2012.01)

(52) U.S. Cl.
USPC .......................................................... 705/35

(58) Field of Classification Search
USPC ................................................... 705/30–45
See application file for complete search history.

(56) References Cited

U.S. PATENT DOCUMENTS

| | | | |
|---|---|---|---|
| 4,588,192 A | 5/1986 | Laborde |
| 4,864,110 A | 9/1989 | Guillou |
| 5,947,526 A | 9/1999 | Neu |
| 6,430,542 B1 | 8/2002 | Moran |
| 6,631,358 B1 | 10/2003 | Ogilvie |
| 2004/0054610 A1 | 3/2004 | Amstutz et al. |
| 2004/0254835 A1 | 12/2004 | Thomas et al. |
| 2004/0267651 A1 | 12/2004 | Jenson et al. |
| 2009/0055327 A1 | 2/2009 | Jones et al. |

OTHER PUBLICATIONS

Yodlee Bill Direct Product, described at http://corporate.yodlee.com/solutions/personal_finance/billdirect/index.html.
The Ultimate Peronsal Finance Solution product by Yodlee, Inc., described at http://corporate.yodlee.com/solutions/personal_finance/index.html.
Yodlee Alerts product by Yodlee, Inc., described at http://corporate.yodlee.com/solutions/personal_finance/alerts/index.html.
Yodlee Toolbar product by Yodlee, Inc., described at http://corporate.yodlee.com/solutions/personal_finance/toolbar.index.html.
Advisor view product by Yodlee, Inc. described at http://corporate.yodlee.com/solutions/wealth_management/advisorview/index.html.
Powering Wealth Management Applications by Yodlee, Inc., described at http://corporate.yodlee.com/solugtions/wealth_management/index.html.
Yodlee's iFinity Platform described at http://corporate.yodlee.com/technology/index.html.
Aggregation's ROI by Yodlee, Inc.

*Primary Examiner* — Thomas M Hammond, III
(74) *Attorney, Agent, or Firm* — Fish & Richardson P.C.

(57) ABSTRACT

A asset planning and tracking system plans and tracks progress towards a savings goal and analyzes the consumption of assets that are being used to satisfy the savings goal. The system may further be configured to analyze a user's periodic (e.g., monthly, quarterly, yearly) transactions and provide suggested transactions if the user has excess income for the period. An asset planning and tracking system may be implemented in the context of a retirement planning system to aid a non-retired user in planning for his or her retirement and to aid a retired user in tracking the consumption of retirement assets.

21 Claims, 9 Drawing Sheets

ASSET PLANNING AND TRACKING

CLAIM OF PRIORITY

This application is a continuation of U.S. application Ser. No. 10/740,159, which was filed Dec. 17, 2003, the entire contents of which are incorporated herein by reference.

TECHNICAL FIELD

This invention relates to automated financial management of a person's resources.

BACKGROUND

People sometimes save part of their income toward a goal, such as saving for retirement or a child's college education, and later (upon retirement or the start of college) periodically withdraw part of the saved money.

SUMMARY

In one aspect, the invention features a computer-implemented method that includes receiving information about transactions that occurred in one or more accounts of a user during a period and determining if the user has excess resources based on the received information. If it is determined that the user has excess resources, then a suggested transaction for disposing of at least a portion of the excess resources is generated.

Embodiments may include one or more of the following features. The computer-implemented method may include receiving information indicating the user's preferences for disposing of excess resources then generating the suggested transaction based on information received about the user's preferences. The method may also include computing a periodic savings goal based on the received information and determining if the user has met the periodic savings goal. The method may determine if the user has excess resources by netting debit transactions and credit transactions recorded in the user accounts during the period The method may also include transmitting a message, such as an e-mail message or an SMS/SMTP message, to the user that contains the suggested transaction. Similarly, the method may include receiving an indication back from the user to execute the suggested transaction and executing the transaction.

In another aspect, the invention features a computer-implemented method that includes receiving information about transactions that occurred in one or more accounts of a user during a period, determining if the transactions indicate that a savings plan of the user has been exceeded based on the information received and generating a suggested transaction if the savings plan of the user has been exceeded.

Embodiments may include one or more of the following features. The method may include receiving information indicating the user's preferences for disposing excess resources and then generating a suggested transaction based on the information received about the user's preferences. The method may further include transmitting a message to the user or posting a web page to a server that contains the suggested transaction. The method may further include receiving information indicating the user's desire to execute the suggested transaction and executing the suggested transaction.

The method may also include computing a periodic savings goal based on information received by the user or an operator on behalf of a user indicating the user's desire to save a certain amount of resources by a certain future date.

Another aspect of the invention features a computer-implemented method that includes determining if a user has consumed resources budgeted for a period based on information received about transaction that occurred in one or more of the user's accounts during the period and generating a suggested transaction for disposing at least a portion of the excess resources if the user has not consumed the resources budgeted for the period.

Embodiments may include one or more of the following features. The method may include receiving information indicating the user's preferences for disposing of excess resources and then generating a suggested transaction based on the information received indicating the user's preferences. The method may further include transmitting a message to the user or posting a web page to a server that contains the suggested transaction. The method may further include receiving information indicating the user's desire to execute the suggested transaction and executing the suggested transaction.

Another aspect of the invention features a system that includes a setup module configured to receive information indicating a user's preferences for disposal of excess resources, a storage device configured to store the user's preferences, an aggregation module configured to periodically retrieve transaction information about one or more accounts, and an execution module configured to determine if the user has excess resources during a period and, if the user has excess resources, then generate a suggested transaction for disposal of the excess income.

Embodiments may include one or more of the following features. The system may also include a message generation module configured to form a message that includes the suggested transaction. The financial plan may be a spending plan (budget) or a savings plan (e.g., a retirement savings plan).

The setup module may also be configured to compute a periodic savings plan based on information received that indicates the user's desire to save a certain amount of resources by a certain future date. The execution module may also be configured to execute the suggested transaction in response to information indicating the user's desire to complete the suggested transaction.

Another aspect of the invention features a computer-implemented method that includes using information about transactions that occurred in one or more accounts of a user to determine whether the user's financial situation matches a planned financial situation and automatically suggesting a transaction in an account based on the determination.

Embodiments may include one or more of the following features. The planned financial situation may be a savings plan, such as a retirement savings plan, or a spending plan, such as a retirement budget.

The method may also include receiving information about transactions that occurred in one or more accounts and receiving information indicating the user's preferences for disposal of excess resources.

Other features and advantages of the invention will be apparent from the description and from the claims.

DETAILED DESCRIPTION

Figure 1:
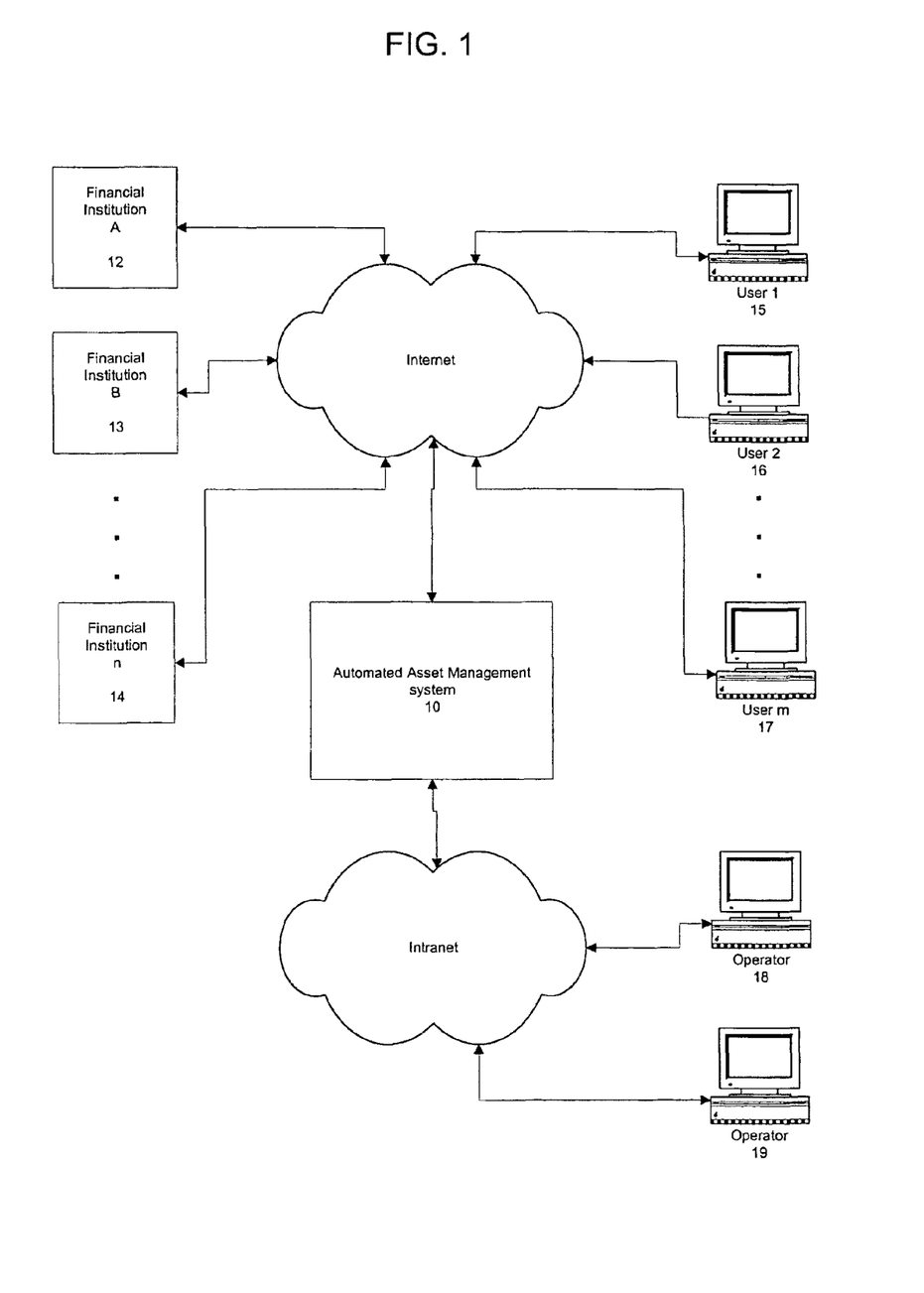
FIGS. 1-2 are a block diagrams of an account management system.

As shown in FIG. 1, an account management system 10 is in communication with several financial institutions 12, 13, 14 and several user terminals 15, 16, 17 using the Internet. The system 10 is also in communication with several operator terminals 18, 19 over an intranet. The operator of an operator terminals 18, 19 may be a customer service representative who may assist the user in configuring the system, but may not provide financial advice to the user, or a licensed broker or financial advisor who may provide financial advice to the user while assisting the user in configuring the account management system for the particular user. The operator may provide other services related or even unrelated to the accounts being managed. In addition to the operator terminals 18, 19, the operator has access to a telephone and facsimile machine (not shown) to facilitate communication with a user.

Figure 2:
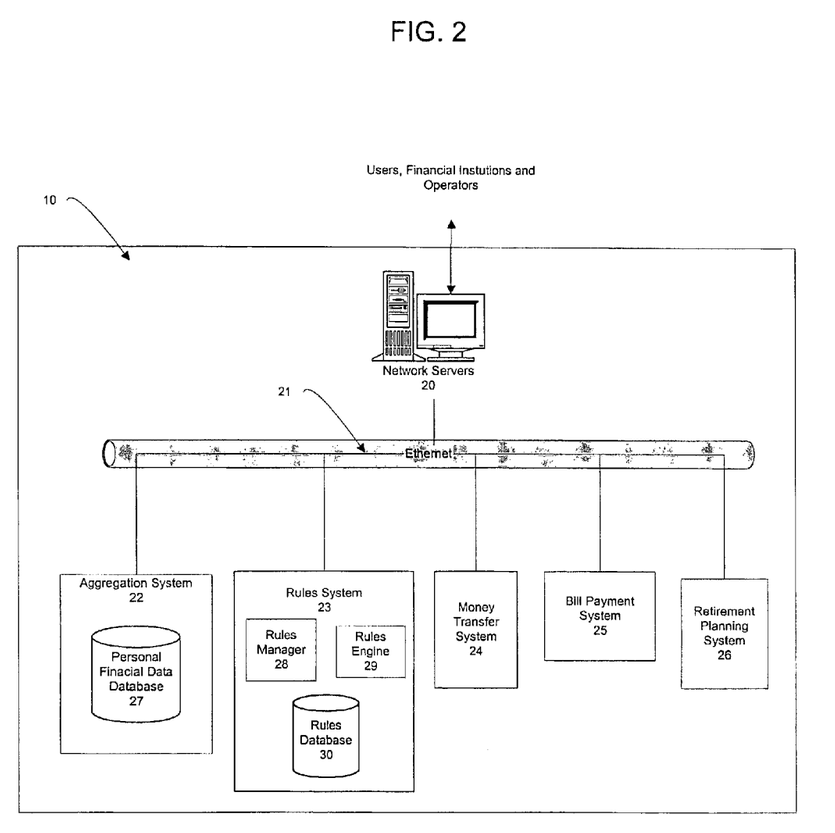

As shown in FIG. 2, the account management system 10 includes a network server 20 that manages network traffic between the account management system 10 and the users 15, 16, 17, financial institutions 12, 13, 14 and operators 18, 19. The network server 20 is in communication using a local area network 21 with an aggregation system 22, a rules engine system 23, a bill pay system 25, a money transfer system 24, and a retirement planning system 26.

The aggregation system 22 is configured to periodically (e.g., once per day) retrieve and store personal financial data for each user in a database 27. For each user, the personal financial data database 27 includes account information from each of the user's accounts regardless of which financial institution maintains the account. For example, if a user maintains a checking account at Bank of America™, a money market account at Fidelity Investments™, and a mortgage account at FannieMae™, the database 27 will include account information about all three accounts. In a preferred embodiment, the account information stored within the database is a complete record of all transactions on the account. A "personal financial account" or an "account" as used in this description includes any asset account, such as checking, savings, brokerage, money market, 401(k)s, IRAs, whole life insurance policies, annuities, or the like, as well as any liability account, such as mortgages, car loans, student loans, personal loans, utility accounts, home equity lines, or the like. The term "financial institution" as used in this description refers to any individual, company, corporation, partnership, government entity, or any other entity that maintains a personal financial account, and includes such entities as banks, brokerage companies, mutual fund companies, life insurance companies, mortgage companies, loan service companies, utility companies, and companies that manage pensions or 401(k) account.

To limit the capacity needed for the database, other implementations may configure the database to include a record of all transactions on an account for a certain time period (e.g., all transactions within the past three months). In another configuration, the database simply maintains the current balance of the account. The aggregation system 22 may be any known aggregation system, such as the Yodlee iFinity™ system, that periodically retrieves and stores account data from the various financial institutions each user maintains an asset or liability account.

The rules system 23 includes a rules setup module 28, a rules database 29, and a rules engine 30. The rules setup module 28 is a software program that prompts the user for information to set up rules that specify how the system 10 is to manage the user's accounts. The rules set up by each user are stored in the rules database 29 and are accessed by the rules engine 30 to automatically manage the user's accounts. An example of a rules system that may be used in the account management system is described in a co-pending application titled "Financial Account Management" to Steve Elterich and John McDonough filed on the same date as this disclosure, and which is herein incorporated by reference.

The money transfer system 24 is configured to permit a user to transfer money between accounts and may be any system known in the art for facilitating electronic money transfers between accounts, such as the Fidelity Money Line™ system. The bill payment system 25 is configured to permit a user to pay bills on-line by "writing" an electronic check. The bill payment system 25 may be any on-line bill payment system known in the art, such as the Fidelity Bill Pay$^{SM}$ system.

As will be explained in more detail below, the retirement planning system 26 is configured to operate in different ways depending upon whether the user is retired. If the user is not retired, the retirement planning system 26 is configured to project the amount of money a user must save per period (e.g., per month) in order to meet his retirement goal and tracks the user's progress toward the retirement goal. If the user is retired (and is drawing upon his or her retirement assets), then the retirement planning system is configured to analyze and provide the user with information about the consumption of the user's retirement assets.

Figure 3:
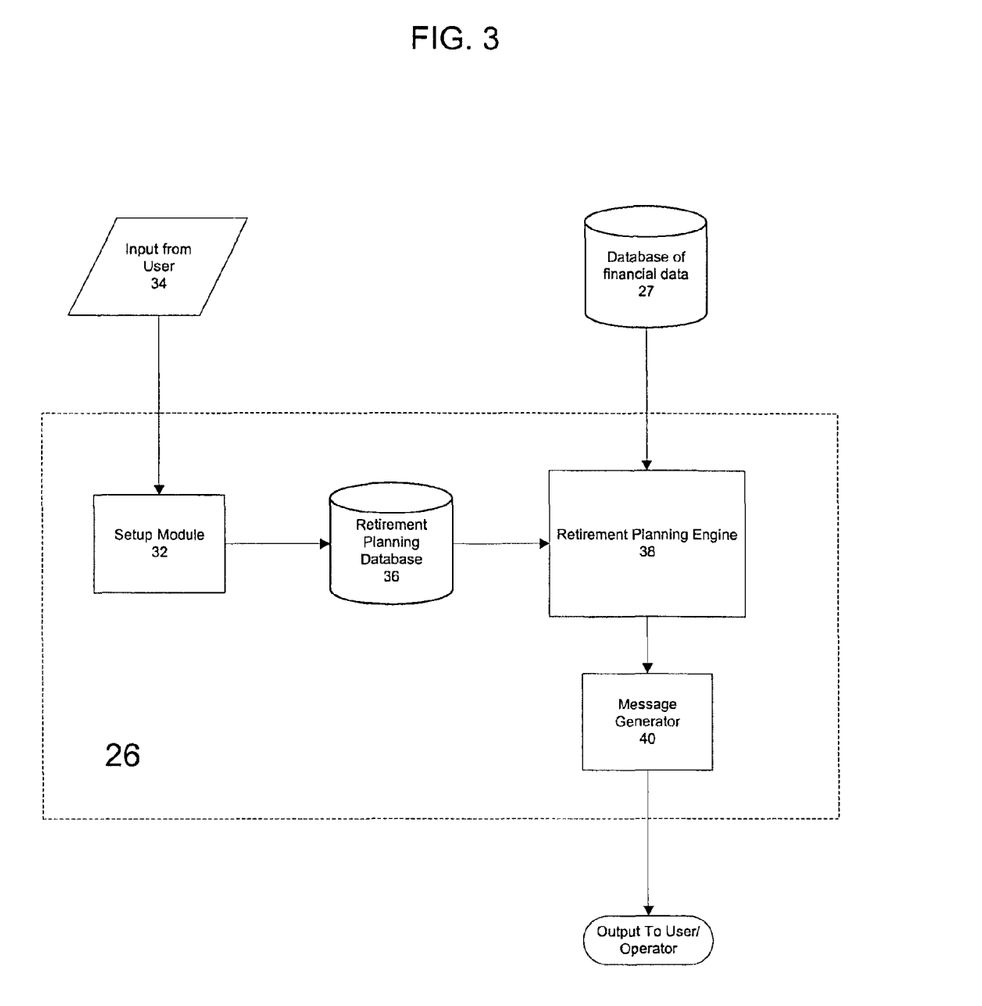
FIG. 3 is a block diagram of a retirement planning system.

Referring to FIG. 3, the retirement planning system 26 includes a setup module 32 that receives input from a user 34, a retirement planning database 36 that stores retirement data (e.g., retirement goals, projected retirement date, and an estimated rate of return) for each user of the system, a retirement planning engine 38 that analyzes the user's periodic (e.g., monthly) transactions and a message generator 40 that produces messages to the user or an operator.

In order for retirement planning system 26 to track and analyze a user's retirement assets, the user first configures the system 26 during an activation session.

Figure 4:
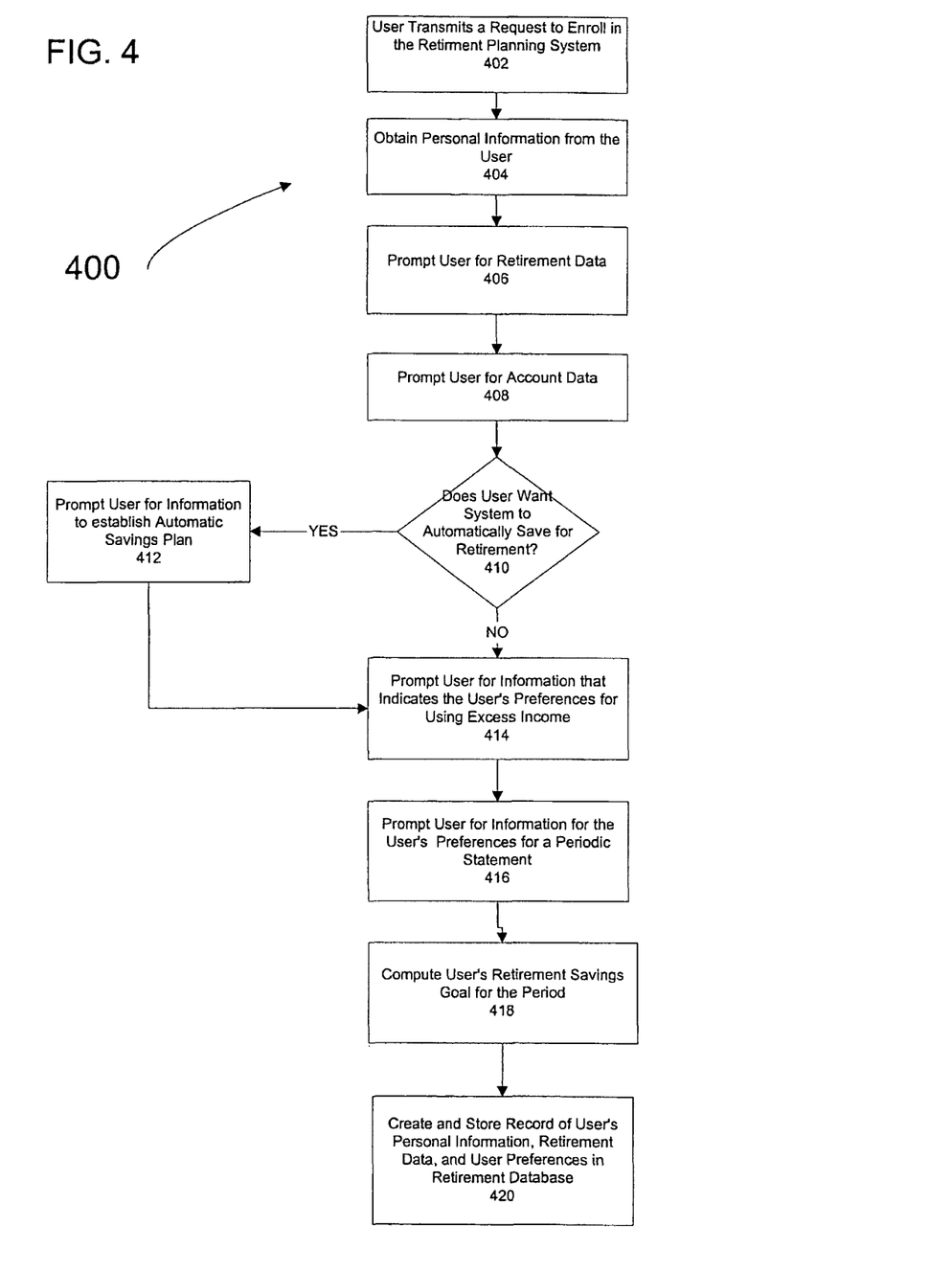
FIG. 4 is a flow chart illustrating a user activation session.

For example, as shown in FIG. 4, a user (e.g., user 1 shown in FIG. 1) initially establishes communication with the retirement planning system 26 using the Internet and indicates a desire to activate the retirement management system 26 by, for example, clicking on a button in a graphical user interface (block 402). In response, the setup module 32 prompts the user to enter personal information about the user such as the user's name, age, mailing address, e-mail address, martial status, current income, or other personal information (block 404). If the user has already registered with another system associated with the retirement planning system, e.g., the account management system 10, the setup module extracts the personal information stored about the user from the other system and prompts the user to confirm the accuracy of the data. The setup module also prompts the user to complete an electronic investor's profile questionnaire (IPQ) form to obtain information regarding the user's investment preferences and risk tolerance.

After the setup module obtains personal information about the user, the process prompts the user for retirement data (block 406). Retirement data is data about the user's financial retirement plan such as the user's projected retirement age, financial retirement goals, current retirement assets and accounts, and an expected rate of return for the user's portfolio of retirement assets. In one implementation, the setup module prompts the user to indicate whether the user is retired and is drawing upon his or her retirement assets or whether the user is not retired and is saving for retirement. If the user indicates that he or she is not retired, then the setup module prompts the user to complete an electronic investor's retirement questionnaire (IRQ) form, which asks the user to provide the following retirement data:

a. the user's projected retirement age;
b. the amount of monthly after-tax income (expressed in current dollars) the user desires to have available after retirement;
c. a list of the user's current retirement assets (e.g., 401(k) accounts, IRAs, annuities, whole life insurance policies that are intended to be cashed out at retirement, and other accounts or assets earmarked for retirement); and
d. an expected rate of return for the user's retirement assets.

If the user indicates that he or she is retired, then the setup module prompts the user for the following information:

a. the age at which the user retired;
b. the user's current age;
c. a list of the user's current retirement assets and income sources; and
d. an expected rate of return for the user's retirement assets.

If the user has previously registered accounts with the account management system 10, the setup module queries and extracts a list of the user's asset accounts and asks the user to indicate which asset accounts are earmarked for retirement (for a non-retired user) or being used for retirement (for a retired user). The setup module also asks the user whether the user has any additional assets (e.g., fully-owned real estate, jewelry or valuable collections) that the user plans to consume during retirement.

With respect to the expected rate of return (items d above), the setup module 32 projects a rate of return for a user based on the user's current portfolio of retirement investments and asks the user to confirm or change the projected rate of return.

In one implementation, the setup module also permits the user to specify a projected inflation rate. In another implementation, the retirement planning system 26 has a preprogrammed inflation rate (e.g., 3% per year).

After the setup module 32 receives the user's retirement data, it then prompts the user for information regarding the user's accounts, including all asset and liability accounts (block 408). If the user has previously registered accounts with the account management system 10, the setup module may query and extract a list of the user's accounts from the personal financial data database 27 and ask the user if the assets list is accurate and complete or whether the user would like to add or delete assets from the list.

After the setup module 32 receives data regarding the user's accounts, the setup module asks a non-retired user if the user would like the system to automatically save for the user's retirement (decision block 410). If the user is not retired, then decision block 410 is skipped and the setup module proceeds directly to block 414 described below. If the non-retired user indicates a desire for the system to automatically save for the user's retirement, the setup module prompts the user for information that enables the system to automatically save for the user's retirement (block 412). In this regard, the setup module prompts the user for information about the amount and source or sources of funds from which the user desires the system to fund the user's retirement savings account. For example, the user may have a paycheck deposited in a checking account each month and may indicate a desire to have the system automatically transfer a portion of each paycheck (expressed in terms of an absolute dollar amount or a percentage of the paycheck) into an IRA account or other account earmarked for retirement. The setup module would recommend a periodic amount the user must save in a tax-deferred or taxable account in order to meet the user's retirement goals based on the retirement and account data provided by the user.

After the setup module has obtained information sufficient to automatically save for a non-retired user's retirement or if a user has indicated a desire not to have the system automatically save funds for the user's retirement, the setup module prompts the user for information that indicates the user's preferences for how to use excess monthly income (block 414). In this regard, the setup module asks the user a series of questions about how the user would spend extra amounts of money at the end of a month.

In one implementation, the system asks a non-retired user what the user would do if he or she had $500 left over at the end of the month after paying off all monthly bills and saving for retirement and provides the user with a series of choices such as, spend the money, save the money, pay off debt with the money or some combination of the above. Similarly, the system asks a retired user what the user would do if he or she had $500 of extra retirement income after paying off all monthly bills and provides the user with the same series of choices, i.e., spend the money, save the money, pay off dept or some combination of above.

If the user chooses to spend the money, the system then provides the user with a comprehensive list of items and asks the user to rate how likely it would be for the user to spend the money on the listed items. For example, the setup module may provide the user with a list of items and ask the user to rate each item on a scale. Additionally, the setup module prompts the user for information regarding preferred vendors for various products or services and preferred manufacturers of various products. For example, if the user indicates that he or she would like to spend excess income on electronics products, the system may obtain additional information from the user indicating that the user prefers "name-brand" electronics products such as Bose™, Sony™, Nikon™, or Hewlett-Packard™ over other manufacturers' products. If a user indicates a desire to spend excess income of jewelry, the system may obtain additional information from the user indicating that the user prefers a specific local jeweler over other jewelers. Similarly, if a user indicates a desire to spend excess income on travel, the system may obtain the user's preferences about locations and airlines.

If the user indicates that he or she would save the money, then the setup module provides the user with a comprehensive list of savings goals for the money (e.g., put the money towards the user's retirement savings, child's or grandchild's education, the purchase of a vacation home, automobile or boat, or a "rainy day" fund) and asks the user to rate how likely it would be for the user to save the funds towards the listed goals. For any savings goals that the user indicates a high likelihood of putting money towards, the setup module asks the user to identify the time horizon for the particular goal. Additionally, if the user has also registered his or her accounts with the account management system 10, then the setup module queries and extracts the user's asset accounts from the personal financial data database 27 (shown in FIGS. 2-3) and asks the user to correlate savings goals, if any, with the user's asset accounts.

Similarly, if the user indicates that he or she would pay off debt, the setup module provides the user with a list of debts (e.g., mortgage, car loan, credit card, student loans, personal loan, etc.) and asks the user to rate how likely it would be for the user to put the money towards the listed debt. If the user has also registered his or her accounts with the account management system 10, then the setup module queries and extracts the user's liability accounts from the personal financial data database 27 and asks the user to rate how likely it would be for the user to pay off each of the user's liability accounts. The setup module is also configured to recommend to the user to prioritize paying off debts with higher interest rates.

If the user indicates that he or she would likely use the excess funds in some combination of spending, saving or paying off debt, the setup module prompts the user for information indicating what portion of the excess the user would spend, save or pay off debt. Then the setup module prompts the user for information indicating how the user would spend the money, the savings goal of the money, or what debts the user would pay down in the manner described above. In this way, the setup module builds a profile of the user and, if the retirement planning system detects excess funds at the end of a period (e.g., at the end of a month), the system 26 can notify the user of the excess and suggest various ways in which the user may use the funds based on the user profile.

Referring back to FIG. 4, after the setup module collects information about the user's preferences for using extra income, the setup module prompts the user for information regarding the user's preferences for receiving a periodic statement (block 416). In this regard, the setup module may ask the user to indicate whether the user would like monthly, quarterly, bi-annually or annual statements showing the user's progress towards his or her retirement goals. The message generator 40 (shown in FIG. 3) is configured to send messages in many formats, e.g., paper, SMS, SMTP, facsimile, Universal Resource Locator (URL), to many endpoints, e.g., mail, network printer, SMS/SMTP device, e-mail, or webpage. Accordingly, the setup module is also configured to prompt the user for information indicating the user's preference as to how the user would like to receive periodic statements.

After obtaining the user's preference on how often the user would like to obtain a periodic statement, the setup module computes the amount a non-retired user must put towards his or her retirement assets per period (e.g., per month) in order to meet the user's retirement goals based on the retirement and account data supplied by the user (block 418). Alternatively, for a retired user, the setup module computes a periodic retirement budget based on the user's assets (retirement and non-retirement), the user's life expectancy, the expected rate of return, and the projected inflation rate (block 418). In either case, the setup module will display this figure to the user and ask the user if he or she would like to change any of the underlying data (e.g., the user's retirement goals, expected rate of return).

After collecting the above information from the user, the setup module creates and stores a record of the user's personal information, account information, retirement data and preferences in the retirement database (block 420). After the user's record of information has been created in the retirement database, the retirement planning engine 38 is able to track and analyze the user's progress towards his or her retirement goals. If the user wants to change any of the information contained in the retirement database, the user may initiate an update session, which causes the setup module to present the user with the previously entered information and ask the user to indicate how he or she would like to modify the data. Once the user makes the desired modifications, the setup module stores the new information in the user's record of information stored in the retirement planning database 36.

Information transferred between the user and the setup module 32 can be interfaced through an operator 18, 19 (e.g., a customer service representative, a licensed broker or a licensed financial advisor) during an activation session or an update session. For example, a licensed broker or financial advisor can engage the user in a discussion about the user's retirement goals and financial resources and obtain information from the user through a telephone call or a face-to-face meeting and enter the appropriate information into the setup module 32. Similarly, a customer service representative can be contacted by the user in order to assist the user with setting up the retirement planning system 26.

Operation of the retirement planning system shown in FIGS. 1-3 is illustrated in FIG. 5.

As shown in FIG. 5, after a user has activated the system 10, the retirement planning engine 38 (shown in FIG. 3) will periodically (e.g., once a month, once a quarter, once a year, etc.) query the personal financial data database 27 to obtain data indicating all transactions (i.e., debits and credits) on every user account that were recorded during the period (block 502).

Figure 5A:
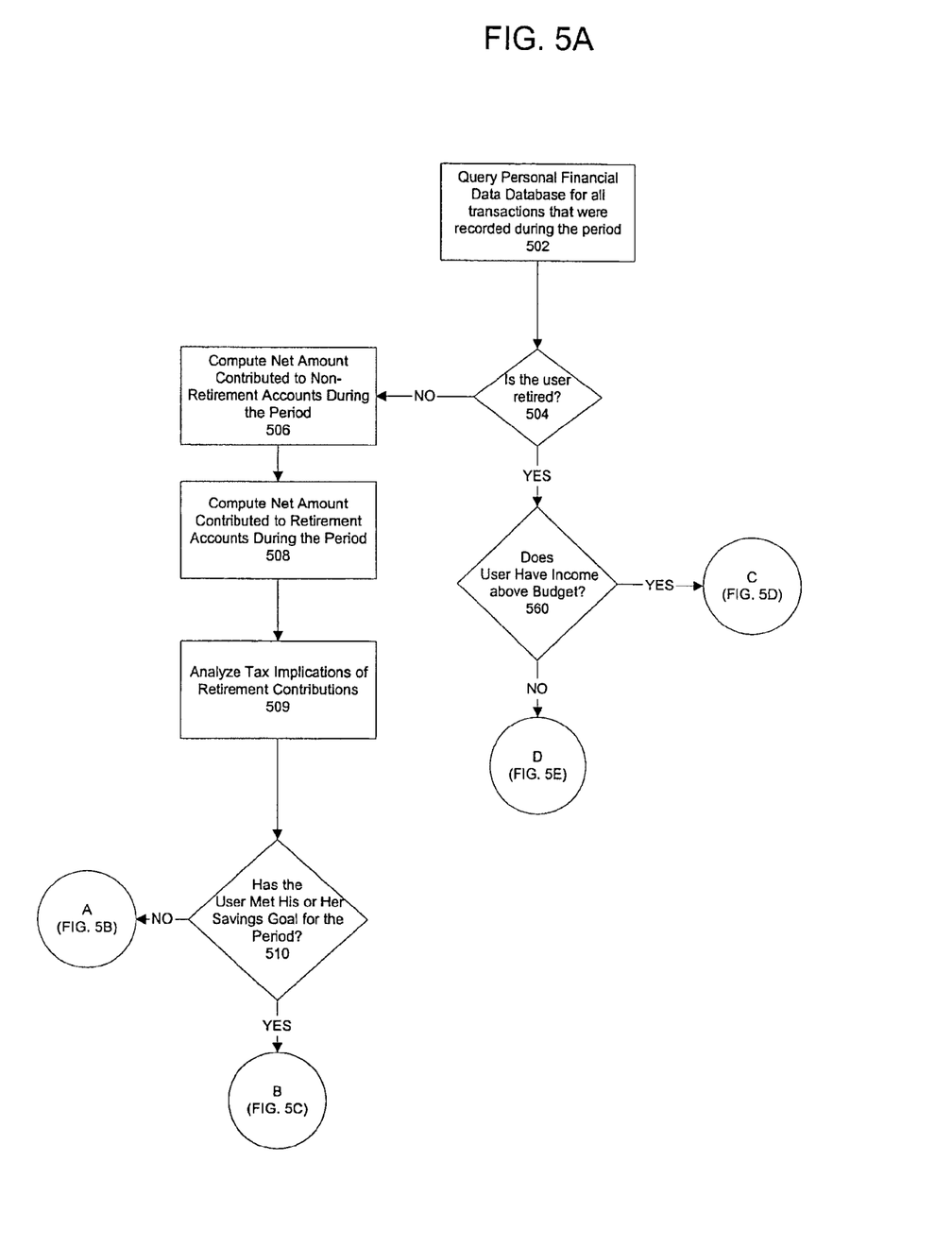
FIGS. 5A-5E are flow charts illustrating operation of a retirement planning system.

After obtaining data indicating the transactions that were recorded over the period, the retirement planning engine 38 determines whether the user is retired by looking up the user's retirement data stored in the retirement planning database 36 (decision block 504).

If the retirement data indicates that the user is not retired, the retirement planning engine 38 computes the net amount deposited into non-retirement and retirement accounts during the period (blocks 506 and 508). The retirement engine determines which accounts are retirement accounts based on information stored about each account in the retirement planning database 36 that was provided by the user in the activation session (or a subsequent update session). In another implementation, the retirement planning engine 38 determines if a user is retired by scanning the user's transaction history for a deposit to a 401(k) account, or an IRA account. If there is a recent deposit (e.g., within the period) in one of these accounts, then the retirement planning engine 38 presumes that the user is not retired. If there is not a deposit, then the retirement planning engine scans that user's transaction history for a payroll deposit. If there is a payroll deposit, then the retirement planning engine 38 presumes that the user is not retired. If there is no payroll deposit, then the retirement planning engine 38 presumes that the user is retired if the user is age 55 or older. Otherwise, the retirement planning engine 38 presumes that the user is not retired, but is unemployed or otherwise not receiving a regular payroll deposit.

After computing the net amount deposited into non-retirement and retirement account during the period, the retirement planning engine checks to ensure that the deposits into the retirement accounts comport with current state and federal tax laws (block 509). In this regard, the retirement planning engine may access the retirement database to determine if the user is eligible to contribute to an IRA given the user's age and current income level. Similarly, the retirement planning engine may track the aggregate amount the user has deposited into tax deferred retirement accounts (e.g., an IRA, Roth IRA or a 401(k) account) to ensure that the user has not deposited more than the maximum contribution amount prescribed by law. If the retirement planning engine determines that the user has reached the maximum limits a tax deferred savings account, the planning engine automatically deposits the funds into to a taxable account.

After computing the amount that was deposited into non-retirement and retirement accounts during the period, the system determines whether the user has met his or her retirement savings goal for the period (decision block 510). As previously described, the user's savings goal for the period is determined based on the user's retirement data and account data obtained during the setup session (or a subsequent update session).

Figure 5B:
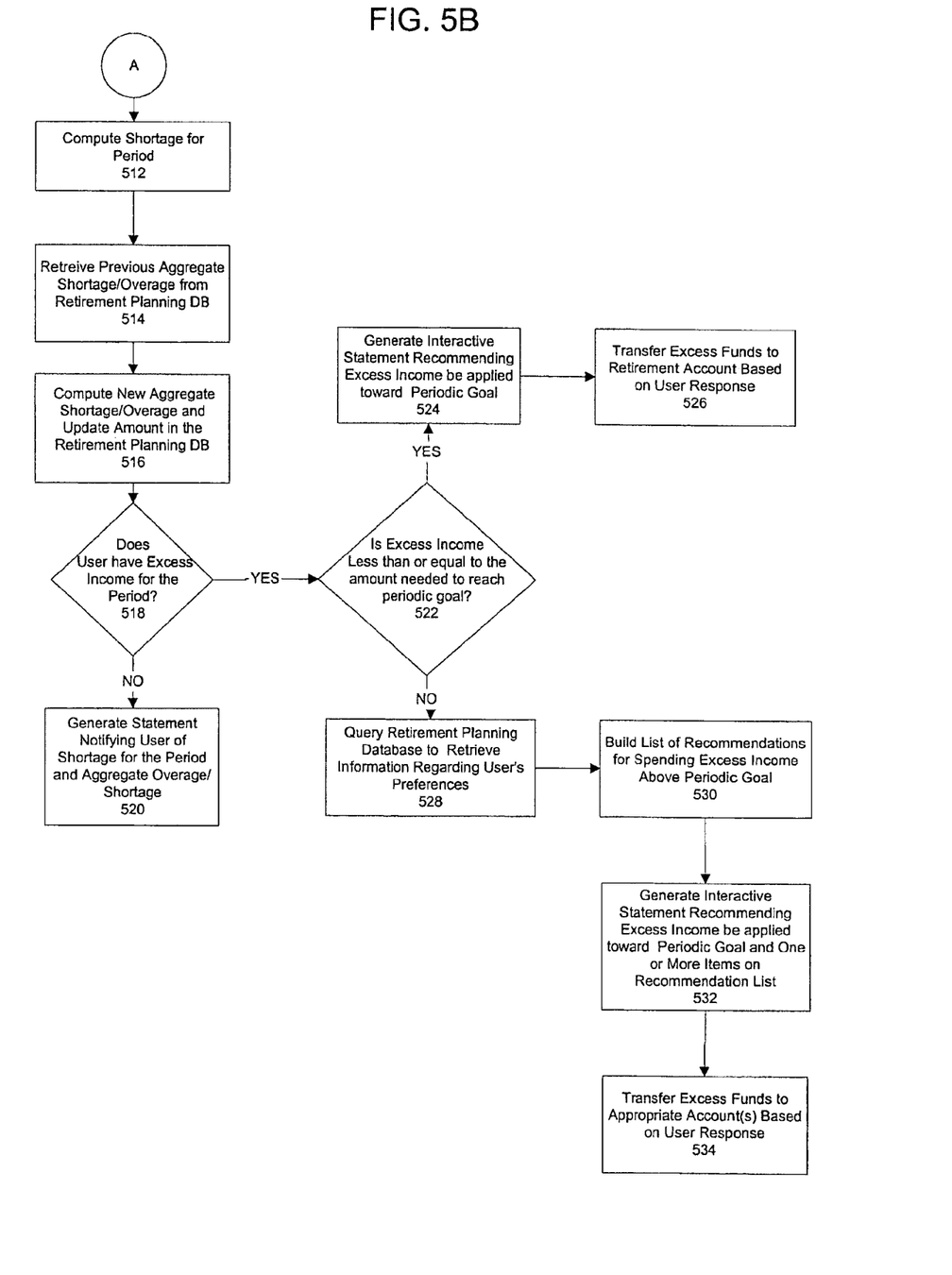

If the retirement planning engine 38 determines that the user has not met his or her periodic retirement savings goal, the retirement planning engine 38 then computes the amount which the user is under the periodic goal (block 512 on FIG. 5B).

The retirement engine 38 then retrieves information from the retirement planning database 36 that indicates the aggregate amount by which the user has underfunded or overfunded the user's retirement accounts as of the previous period. For example, a user may be scheduled to have an aggregate of $4,000 saved for retirement after four months (e.g., scheduled to save $1,000 per month), but may have been able to save an average of $1,100 per month, leaving the user's retirement savings plan overfunded by $400 after the fourth month. If this first period the retirement planning engine 38 has tracked the user's retirement savings plan, then the amount by which the user is under or over the periodic goal is recorded in the retirement planning database 36 as the aggregated shortage/overage amount.

After retrieving the user's aggregate shortage/overage from the previous period, the retirement planning engine 38 computes a new aggregate shortage/overage based on the shortage of the current period (block 516). To continue with the above example, if the user has underfunded his or her retirement accounts by $300 for the period, the user's aggregate overage will be reduced from $400 to $100. After computing the new aggregate shortage/overage, the retirement planning engine 38 updates the retirement planning database 36 with this new amount.

The retirement planning engine 38 determines whether the user has excess income for the period by netting the debits and credits recorded in the user's non-retirement accounts for the period (decision block 518). If the retirement planning engine 38 determines that the user does not have excess income for the period (and thus no source from which to fund the shortage in retirement savings for the period), the retirement planning engine 38 transmits to the message generator 40 an indication that the user does not have excess income for the period along with the amount the user has saved for retirement for the period, the amount by which the user was short of the user's periodic retirement savings goal, the total aggregate amount of retirement savings, and the amount the user is over or under the user's aggregate retirement savings goal. The message generator 40 assembles this information in a statement that is sent to the user (block 520).

If the retirement planning engine 38 determines that the user has excess income for the period, the retirement planning engine 38 determines if the excess income for the period is less than or equal to the amount needed to reach the user's periodic retirement savings goal (decision block 522).

If the retirement planning engine 38 determines that the excess income is less than or equal to the amount needed to reach the periodic retirement savings goal, the retirement planning engine 38 causes the statement generator 40 (shown in FIG. 3) to generate an interactive statement recommending that the excess income be applied towards the periodic goal (block 524). An interactive statement is an electronic message that allows the user to submit a response back to the system. An interactive statement may be in the form of an electronic mail message sent to a user's electronic mailbox, an SMS or SMTP message sent to a user's text-messaging device, or a webpage posted to a website that may be accessed by the user. In one implementation, the interactive statement generated by the statement generator 40 may be an e-mail message that includes the amount the user has saved for retirement for the period, the amount by which the user was short of the user's periodic retirement savings goal, the total aggregate amount of retirement savings, the amount the user is over or under the user's aggregate retirement savings goal, and the amount of excess income for the period. The interactive statement may further include a recommendation to apply the excess income towards the user's periodic retirement savings goal and may provide a hyperlink that the user may click on if the user wants the retirement planning system to transfer the excess income to one or more retirement savings accounts.

If the user indicates that the user would like the system to transfer excess income to one or more retirement savings account, the retirement planning engine 38 then transfers the excess income to one or more of the user's retirement accounts (block 526). For example, if the user clicks on a hyperlink to a website in an e-mail indicating that the user would like the system to transfer excess income to one or more retirement accounts, the user may be taken to a secure website that asks the user to input the amount of the excess income the user would like transferred as well as an identification of which retirement account or accounts the user would like the funds to be transferred. The website may include a list of each of the user's retirement accounts, how much the user has contributed to each account in over a tax year, and information about the maximum amount, if any, that may be contributed to the retirement accounts in a tax year (e.g., contributions to an IRA account in a tax year are currently capped by law and are not available to persons with adjusted gross income over a specified amount). After the user provides the information about the amount of the excess income to be transferred and the target accounts, the retirement planning engine 38 transfers the funds accordingly and sends the user a confirmation message.

Referring back to decision block 522 in FIG. 5B, if the retirement planning engine 38 determines that the excess income is greater than the amount needed to reach the periodic retirement savings goal, the retirement planning engine 38 queries the retirement planning database 36 to retrieve information about the user's spending preferences (block 528). Next, the retirement planning engine 38 builds a list of recommendations for spending the excess income above the periodic retirement savings goal based on the information about the user's spending preference retrieved from the retirement planning database 36 (block 530) For example, the user may have indicated in an activation or update session that the user would like to use excess income purchase jewelry and to save for a vacation home. The user may have also indicated in the activation or update session a particular account that the user has earmarked for a vacation home. In this example, the retirement planning engine 38 builds a list of the following recommendations:

a. transfer excess income above the amount needed to meet periodic retirement savings goal to the account earmarked for a vacation home purchase;
 b. use excess income to purchase a pair of gold earrings on sale at recommended merchant "A";
 c. use excess income to purchase a silver necklace on sale at recommended merchant "B";
 d. use excess income to purchase a gold bracelet on sale at recommend merchant "C".

The retirement planning engine 38 builds the list of items for sale from a list of preferred vendors by querying product information provided over the Internet by the vendors according to the amount of excess income any user preference information stored in the retirement planning database 36. For example, the retirement planning system 26 may have extensive information about a user's preference and may have information that indicates not only does the user have a preference to spend excess income on jewelry, but also that the user prefers sterling silver jewelry. The list of recommended vendors for a particular product market may be preprogrammed into the system by a system programmer or it may be specified by the user during an activation or update session.

After building a list of recommendations, the retirement planning engine 38 transmits the list to the statement generator 40, which incorporates the list into an interactive statement that is sent to the user (block 532). In addition to information about the user's retirement savings (e.g., amount the user has saved for retirement for the period, the amount by which the user was short of the user's periodic retirement savings goal, the total aggregate amount of retirement savings, and the amount the user is over or under the user's aggregate retirement savings goal), the interactive statement also notifies the user that the user has excess income and recommends that the user apply the excess income to first meet the periodic retirement savings goal and then use the surplus on one or more of the items on the recommendation list.

As explained above, the user may provide information back to the retirement planning system through the interactive message in order to have the system execute any desired transactions (block 530). For example, suppose the user provides information back to the system commanding the system to use the excess income to meet the user's periodic retirement goal, purchase gold earrings at jeweler "A" and apply the remainder to the account earmarked for a vacation home. In response to receiving this information back from the user, the retirement planning engine 38 electronically transfers a portion of the excess income sufficient to meet the user's periodic saving goal from one or more of the user's non-retirement accounts to one or more of the user's retirement accounts. The system also automatically purchase the gold earrings by either transferring funds directly to the jeweler, or preferably, charging the earrings on a charge account held by the user (e.g., a Visa or a Mastercard account) and then transferring the purchase amount to the charge account. By making the purchase through a charge account like Visa or Mastercard, the user is able to take advantage of the purchase protections and benefits (e.g., frequently flyer miles) afforded by the charge account. Additionally, if the user does not maintain a balance on the charge account (and thus is not charged interest on purchases), the system 26 may hold the purchase funds in an interest bearing account and then transfer the purchase funds to the charge account on the payment due date for the charge account. The system 26 also transfers the remaining excess income into the account earmarked for a vacation home.

Figure 5C:
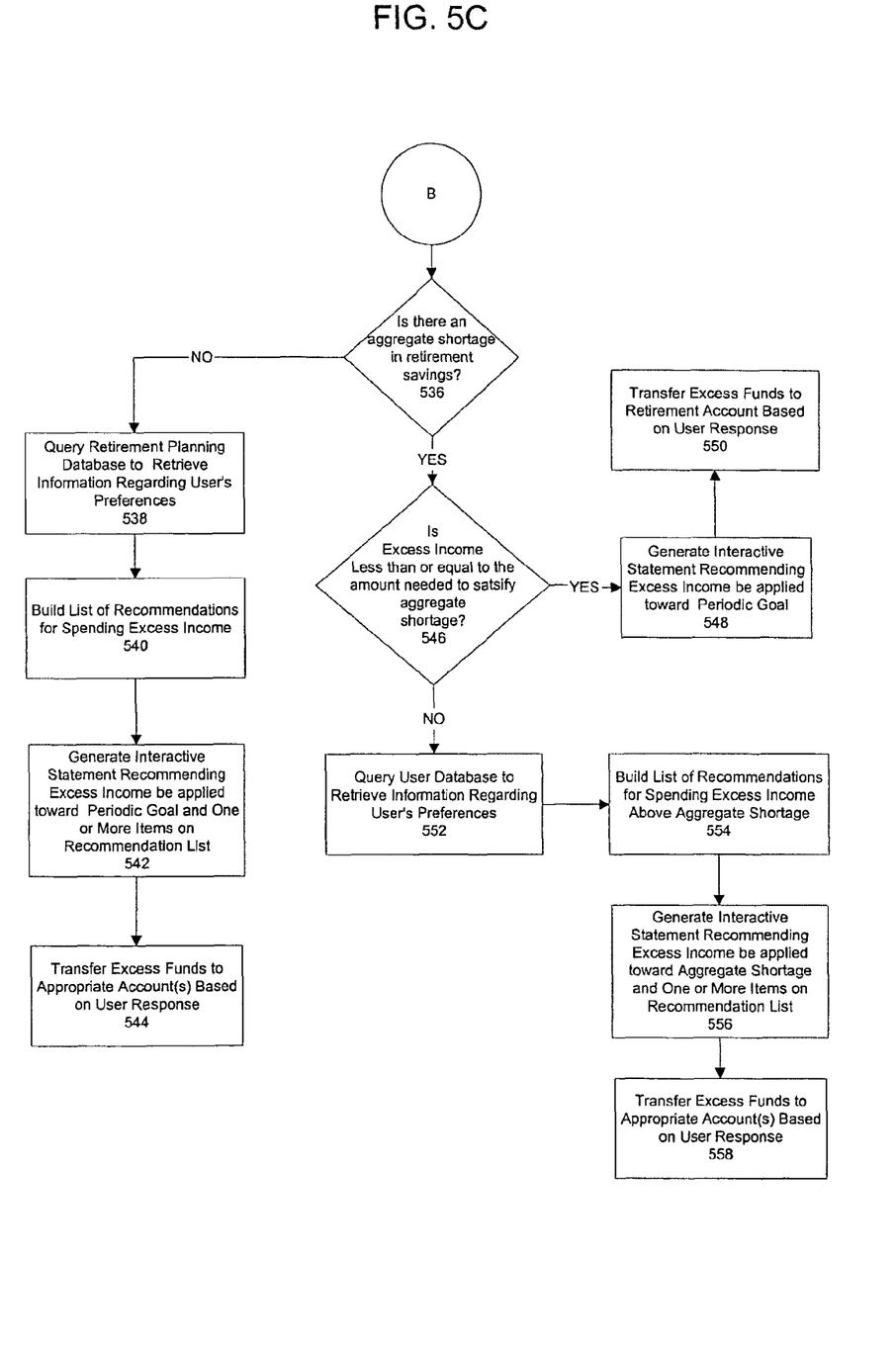
Figure 5D:
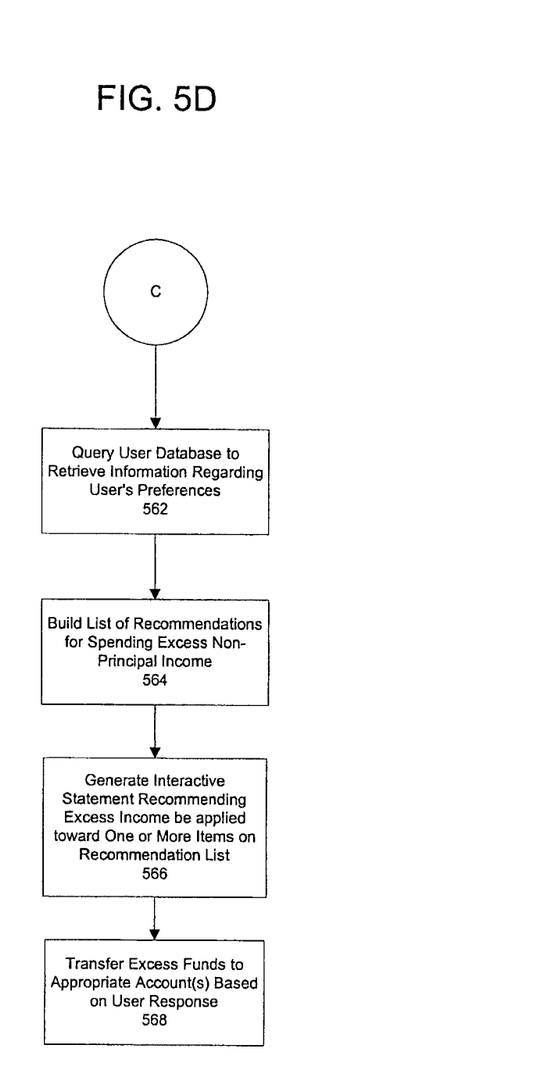

Referring back to decision block 510 in FIG. 5A, if the retirement planning engine 38 determines that the user has met his or her retirement savings goal for the period, the retirement planning engine 38 determines whether there is an aggregate shortage in the user's retirement savings plan (decision block 536 in FIG. 5C).

If the retirement planning engine 38 determines that there is not an aggregate shortage in the user's retirement savings plan (i.e., the user is at or above the current savings goal for the user's retirement savings plan), the retirement engine queries the retirement planning database 36 to obtain the user's spending preferences (block 538), builds a list of spending recommendations (block 540), prompts the message generator to generate an interactive statement with spending recommendations (block 542), and executes any transactions commanded by user in response to the interactive statement (block 544), as previously described with respect to blocks 528, 530, 532 and 534.

If the retirement planning engine 38 determines that there is an aggregate shortage in the user's retirement savings plan, the retirement planning engine 38 determines if the excess income is less than or equal to the amount needed to satisfy the shortage (decision block 546). If the amount is less than or equal to the amount needed to make up the shortage, then the retirement planning engine 38 prompts the statement generator 40 to generate an interactive statement recommending that the excess income be applied towards the user's retirement savings (block 548). If the user responds back to the interactive statement, the system executes any transactions commanded by the user (block 550).

If the retirement planning engine 38 determines that the excess income is greater than the amount needed to make up the aggregate shortage in the user's retirement saving plan, the retirement engine then queries the retirement planning database 36 to obtain the user's spending preferences (block 552), builds a list of spending recommendations (block 554), prompts the message generator to generate an interactive statement with spending recommendations (block 556), and executes any transactions commanded by user in response to the interactive statement (block 558), as previously described with respect to blocks 528, 530, 532 and 534.

Referring back to decision block 504 in FIG. 5A, if the retirement planning engine 38 determines, based on the user's retirement information, that the user is retired, the retirement planning engine 38 determines if the user has income above the user's retirement budget (decision block 560). As described above, the user's retirement budget is the periodic income stream needed to have the after-tax amount desired by the user for the period.

If the user has income above the user's retirement budget, the retirement engine queries the retirement planning database 36 to obtain the user's spending preferences (block 562 shown in FIG. 5D), builds a list of spending recommendations (block 564), prompts the message generator to generate an interactive statement with spending recommendations (block 566), and then executes any transactions commanded by user in response to the interactive statement (block 568), as previously described with respect to blocks 528, 530, 532 and 534. If the user does not spend excess income, the retirement planning engine 38 recomputes the user's projected retirement assets.

Figure 5E:
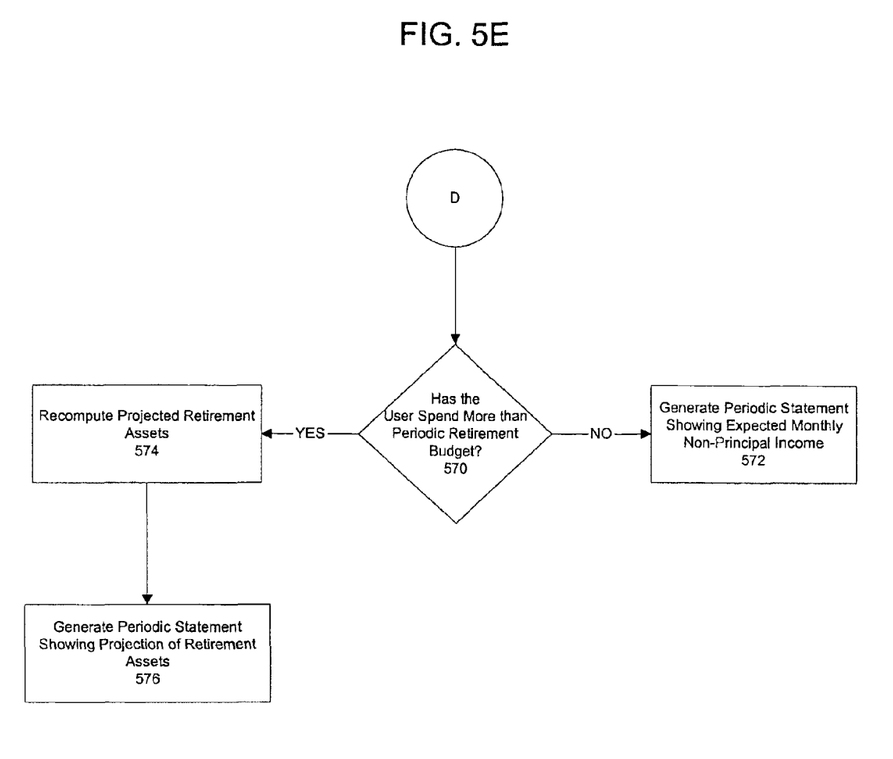

If the retirement planning engine 38 determines that the user does not have income above the user's retirement budget (decision block 560 in FIG. 5A), the retirement engine then determines if the user has spent more than the user's retirement budget (decision block 570 in FIG. 5E). If the user has not spent more than the budgeted amount (i.e., the user has spent exactly the budgeted amount), the statement generator 40 generates a periodic statement showing the projected user's retirement assets (block 572). If the user has spent more than the budgeted amount, then the retirement planning engine 38 recomputes the user's projected retirement assets (block 574) and the statement generator 40 generate a periodic statement showing a projection of the user's retirement assets (block 576).

In one implementation, the retirement planning system is also configured to allow a user to view the user's current progress towards his or her periodic or overall retirement goal at any time by accessing this information over a secure Internet website. The system is also configured to allow a customer service representative, broker or financial advisor to access this information on-line (e.g., through the Internet or an intranet). In this way, a broker or financial advisor is able get a picture of the user's financial resources and spending habits and work to formulate a savings and investment plan tailored for the individual user.

In another implementation, the message generator is configured to monitor Internet messaging services, such as America On-Line™ instant messaging or Yahoo™ messenger, for a user to sign on under a handle they provide during the activation session or a subsequent update session. When the message generator determines that a user has logged on to the messaging service, the message generator opens a chat session with the user to provide the user with automated reminders about saving for retirement, messages about the user's savings for the current period or in the aggregate, or other information relating to the user's retirement planning.

Other embodiments are within the scope of the following claims. For example, an asset planning and tracking system, e.g., retirement planning system 26 shown in FIGS. 2-3, may plans for and tracks progress towards any savings goal (e.g., a house renovation project, a wedding reception, purchase of a second home, a child's college education, or a vacation) and analyzes consumption once the user begins drawing upon the assets. Additionally, an asset planning and tracking system may track other "assets" than financial assets such as frequent flyer miles. In this implementation, a frequently flyer tracking system may track a user's frequent flyer miles against a goal (e.g., sufficient miles for roundtrip tickets to Hawaii for a family of four in five years) and may periodically apprise the user of his progress towards the goal and make recommendations as to how to use excess miles.

What is claimed is:

1. A computer-implemented method comprises:
receiving, by one or more computer systems that comprise a computer processor and memory, information indicative of transactions that debit and credit financial resources from a first set of one or more financial accounts of a user;
periodically receiving by the one or more computer systems information indicative of a recommended amount of financial resources and a savings goal;
periodically determining by the one or more computer systems based on the information received about the transactions that an aggregate balance of the first set of one or more financial accounts exceeds the received information indicative of the recommended amount of financial resources to transfer to a second set of one or more financial accounts of the user to meet the received information indicative of the savings goal;
causing a transfer, by the one or more computer systems, of the recommended amount of financial resources to the second set of one or more financial accounts; and
generating, by the one or more computers, a suggested transaction that has a suggested amount that is based on an amount of financial resources in excess of the periodically determined aggregate balance minus the received information indicative of the recommended amount.

2. The computer-implemented method of claim 1, further comprising:
receiving information indicating the user's preferences for purchasing a product or a service; and
generating the suggested transaction at least partly based on the information received indicating the user's preferences for purchasing the product or the service.

3. The computer-implemented method of claim 1, wherein the suggested transaction comprises a first suggested transaction, and wherein the method further comprises computing the recommended amount of financial resources to meet the savings goal to save a certain amount of financial resources by a certain future date; and
generating a second suggested transaction for saving at least a portion of the amount of financial resources in excess of the aggregate balance minus the recommended amount.

4. The computer-implemented method of claim 1, wherein the suggested transaction is a first suggested transaction to purchase goods and/or services and the method further comprises:
computing the savings goal to save a certain amount of financial resources by a certain future date;
determining that the user has not met the savings goal based on the information indicative of the transactions that debit and credit financial resources from the first set of the one or more financial accounts; and
generating a second suggested transaction for saving at least a portion of the amount of financial resources in excess of the aggregate balance minus the recommended amount to meet the savings goal.

5. The computer-implemented method of claim 1, further comprising:
receiving, from a device used by an operator, information indicating a desire of the user to save a certain amount of financial resources by a certain future date.

6. The computer-implemented method of claim 1, further comprising:
transmitting, to a device used by the user, a message that comprises information indicative of the suggested transaction.

7. The computer-implemented method of claim 1, further comprising:
selecting the message transmitted to the user to be one or more of an electronic mail message, an SMS message, and an SMTP message.

8. The computer-implemented method of claim 1, further comprising:
posting a webpage on a server accessible by the user, the webpage comprising information indicative of the suggested transaction.

9. The computer-implemented method of claim 1, further comprising:
receiving a request from a device used by the user to execute the suggested transaction.

10. The computer-implemented method of claim 1, further comprising:
causing the one or more computer systems to execute the suggested transaction.

11. The computer-implemented method of claim 1 wherein the savings goal is a retirement savings goal and the second set of one or more financial accounts include one or more retirement accounts.

12. A computer system comprising:
a processor; and
a computer program product embodied on a computer-readable storage medium, the computer program product comprising instructions for causing the processor to perform operations comprising:
receiving information indicative of transactions that debit and credit financial resources from a first set of one or more financial accounts of a user;
periodically receiving information indicative of a recommended amount of financial resources and a savings goal;

periodically determining based on the information received about the transactions that an aggregate balance of the first set of one or more financial accounts exceeds the received information indicative of the recommended amount of financial resources to transfer to a second set of one or more financial accounts of the user to meet the received information indicative of the savings goal;

causing a transfer of the recommended amount of financial resources to the second set of one or more financial accounts; and generating a suggested transaction that has a suggested amount that is based on an amount of financial resources in excess of the periodically determined aggregate balance minus the received information indicative of the recommended amount.

13. The computer system of claim 12, wherein the operations further comprise:

receiving information indicating the user's preferences for purchasing a product or a service; and generating the suggested transaction at least partly based on the information received indicating the user's preferences for purchasing the product or the service.

14. The computer system of claim 12, wherein the suggested transaction comprises a first suggested transaction, and wherein the operations further comprise:

computing the recommended amount of financial resources to meet the savings goal to save a certain amount of financial resources by a certain future date; and generating a second suggested transaction for saving at least a portion of the amount of financial resources in excess of the aggregate balance minus the recommended amount.

15. The computer system of claim 12, wherein the suggested transaction is a first suggested transaction to purchase goods and/or services, and wherein the operations further comprise:

computing the savings goal to save a certain amount of financial resources by a certain future date;

determining that the user has not met the savings goal based on the information indicative of the transactions that debit and credit financial resources from the first set of the one or more financial accounts; and generating a second suggested transaction for saving at least a portion of the amount of financial resources in excess of the aggregate balance minus the recommended amount to meet the savings goal.

16. The computer system of claim 12, wherein the operations further comprise:

transmitting, to a device used by the user, a message that comprises information indicative of the suggested transaction.

17. A computer program product embodied on a computer-readable storage hardware device, the computer program product comprising instructions for causing a processor to perform operations comprising:

receiving information indicative of transactions that debit and credit financial resources from a first set of one or more financial accounts of a user;

periodically receiving information indicative of a recommended amount of financial resources and a savings goal;

periodically determining based on the information received about the transactions that an aggregate balance of the first set of one or more financial accounts exceeds the received information indicative of the recommended amount of financial resources to transfer to a second set of one or more financial accounts of the user to meet the received information indicative of the savings goal;

causing a transfer of the recommended amount of financial resources to the second set of one or more financial accounts; and generating a suggested transaction that has a suggested amount that is based on an amount of financial resources in excess of the periodically determined aggregate balance minus the received information indicative of the recommended amount.

18. The computer program product of claim 17, wherein the operations further comprise:

receiving information indicating the user's preferences for purchasing a product or a service; and generating the suggested transaction at least partly based on the information received indicating the user's preferences for purchasing the product or the service.

19. The computer program product of claim 17, wherein the suggested transaction comprises a first suggested transaction, and wherein the operations further comprise:

computing the recommended amount of financial resources to meet the savings goal to save a certain amount of financial resources by a certain future date; and generating a second suggested transaction for saving at least a portion of the amount of financial resources in excess of the aggregate balance minus the recommended amount.

20. The computer program product of claim 17, wherein the suggested transaction is a first suggested transaction to purchase goods and/or services, and wherein the operations further comprise:

computing the savings goal to save a certain amount of financial resources by a certain future date;

determining that the user has not met the savings goal based on the information indicative of the transactions that debit and credit financial resources from the first set of the one or more financial accounts; and generating a second suggested transaction for saving at least a portion of the amount of financial resources in excess of the aggregate balance minus the recommended amount to meet the savings goal.

21. The computer program product of claim 17, wherein the operations further comprise:

transmitting, to a device used by the user, a message that comprises information indicative of the suggested transaction.

* * * * *